(12) United States Patent
Prokop

(10) Patent No.: US 12,213,626 B2
(45) Date of Patent: Feb. 4, 2025

(54) PESTLE AND BOWL ASSEMBLY

(71) Applicant: David Prokop, Sammamish, WA (US)

(72) Inventor: David Prokop, Sammamish, WA (US)

(*) Notice: Subject to any disclaimer, the term of this patent is extended or adjusted under 35 U.S.C. 154(b) by 115 days.

(21) Appl. No.: 17/948,010

(22) Filed: Sep. 19, 2022

(65) Prior Publication Data
US 2024/0090705 A1 Mar. 21, 2024

(51) Int. Cl.
*A47J 43/07* (2006.01)
*A47J 43/044* (2006.01)
*B02C 19/08* (2006.01)

(52) U.S. Cl.
CPC ......... *A47J 43/0711* (2013.01); *A47J 43/044* (2013.01); *A47J 43/0727* (2013.01); *B02C 19/08* (2013.01); *A47J 2043/0449* (2013.01)

(58) Field of Classification Search
CPC .............. A47J 2043/04454; A47J 43/07; A47J 43/0711; A47J 43/0727; A47J 2043/0449; B02C 19/08; A61J 7/0007
USPC ............................................. 241/169.2, 199
See application file for complete search history.

(56) References Cited

U.S. PATENT DOCUMENTS

| | | |
|---|---|---|
| 1,862,181 A | 6/1932 | Emmon, III |
| 1,902,678 A | 3/1933 | Theodoropulos |
| 2,001,036 A | 5/1933 | Prince |
| 2,013,887 A | 6/1935 | Jeppsson |
| 2,046,784 A | 7/1936 | Krause |
| 2,103,928 A | 12/1937 | Bean |
| 2,202,724 A | 5/1940 | Bean |
| 2,209,386 A * | 7/1940 | Chott ............... B02C 19/08 241/199.11 |
| 2,275,901 A | 3/1942 | Harwood |
| 2,330,860 A | 10/1943 | Behar |
| 2,529,120 A | 11/1950 | Wallach et al. |
| 2,599,275 A | 6/1952 | Nelson |
| 2,600,117 A * | 6/1952 | Lamb ............... A47J 43/044 366/74 |
| 2,789,798 A | 4/1957 | Brace |
| 2,847,199 A | 8/1958 | Gasporotti |
| 3,312,433 A | 4/1967 | Peterson |
| 3,677,100 A * | 7/1972 | Kajiwara ............ B01F 27/95 366/287 |
| 3,904,178 A | 9/1975 | Scott et al. |
| 4,026,532 A | 5/1977 | Madan |
| 4,070,711 A | 1/1978 | Smadar |
| 4,277,181 A | 7/1981 | Stahley et al. |
| 4,325,643 A | 4/1982 | Scott et al. |
| 4,504,152 A | 3/1985 | Moller et al. |
| D279,858 S | 7/1985 | Jannssens |

(Continued)

*Primary Examiner* — Jared O Brown
(74) *Attorney, Agent, or Firm* — Sue C. Watson; Southern Plains IP Law PLLC

(57) ABSTRACT

A pestle and bowl assembly comprises a pestle having an upper end adapted to operably connect to a kitchen stand mixer having an electric motor. A lower end of the pestle includes a convex shape which has a frictional surface. The assembly also includes a bowl having a curved wall. The bowl is configured to receive the pestle and one or more food items therein. The bowl is operably held by a portion of the kitchen stand mixer. When the motor of the kitchen stand mixer is activated, the lower end of the pestle spins in a planetary orbit pattern and rotates simultaneously in the bowl to crush, grind and/or press one or more food items held in the bowl against the bowl.

12 Claims, 12 Drawing Sheets

(56) References Cited

U.S. PATENT DOCUMENTS

| | | |
|---|---|---|
| 4,645,352 A | 2/1987 | Valbona et al. |
| 4,927,120 A | 5/1990 | Wang |
| 5,000,578 A | 3/1991 | Artin et al. |
| 5,028,141 A | 7/1991 | Stiegelmann |
| 5,067,666 A | 11/1991 | Sussman |
| 5,106,346 A | 4/1992 | Locher et al. |
| 5,524,530 A | 6/1996 | Nijzingh et al. |
| 5,533,683 A | 7/1996 | Fay et al. |
| 5,553,793 A | 9/1996 | Klearman et al. |
| D384,549 S | 10/1997 | Cesaroni et al. |
| D387,244 S | 12/1997 | Ivy et al. |
| D387,245 S | 12/1997 | Hippen et al. |
| D387,610 S | 12/1997 | Hippen et al. |
| D395,572 S | 6/1998 | Carroll et al. |
| 5,782,558 A | 7/1998 | Roberts |
| 5,823,451 A | 10/1998 | Sharpe |
| D400,759 S | 11/1998 | Doggett |
| 5,908,242 A | 6/1999 | St. John et al. |
| 5,911,505 A | 6/1999 | St. John et al. |
| 5,957,578 A | 9/1999 | Holbrook et al. |
| D416,752 S | 11/1999 | Leverrier |
| 6,059,209 A | 5/2000 | Barson |
| D436,497 S | 1/2001 | Nalbandian |
| D438,424 S | 3/2001 | Po-Hei |
| D438,752 S | 3/2001 | Po-Hei |
| D447,907 S | 9/2001 | Po-Hei |
| 6,312,150 B1 | 11/2001 | Allard et al. |
| D453,444 S | 2/2002 | Garman |
| 6,588,930 B2 | 7/2003 | Wilson |
| 6,622,949 B1 | 9/2003 | Baswick et al. |
| 6,637,683 B1 | 10/2003 | (Lomax) Wilbur |
| D489,569 S | 5/2004 | Smith et al. |
| D489,936 S | 5/2004 | Smith et al. |
| 6,761,477 B2 | 7/2004 | Hallar et al. |
| D540,113 S | 4/2007 | Short et al. |
| D543,634 S | 5/2007 | Lundstrom |
| D545,622 S | 7/2007 | Gomez |
| D564,297 S | 3/2008 | Short et al. |
| D564,298 S | 3/2008 | Short et al. |
| 7,427,041 B2 | 9/2008 | Hall et al. |
| D584,916 S | 1/2009 | Christou |
| D603,214 S | 11/2009 | Huang et al. |
| D612,195 S | 3/2010 | Liu |
| D613,549 S | 4/2010 | Picozza et al. |
| D616,699 S | 6/2010 | Hoare et al. |
| 7,735,763 B2 | 6/2010 | Bell et al. |
| D623,468 S | 9/2010 | Liu |
| D623,891 S | 9/2010 | Huang et al. |
| 7,896,273 B2 | 3/2011 | Grah |
| D642,023 S * | 7/2011 | Reay .............................. D7/682 |
| 7,918,601 B2 | 9/2011 | Branson, III et al. |
| 8,033,488 B2 | 10/2011 | Grah |
| 8,087,602 B1 | 1/2012 | Teng |
| D654,304 S | 2/2012 | Bodum |
| D665,918 S | 7/2012 | Place |
| D669,190 S | 10/2012 | Sharpe et al. |
| D677,520 S | 3/2013 | Choi et al. |
| D683,578 S | 6/2013 | Nordwall |
| D701,078 S | 3/2014 | Gonzalez |
| D702,853 S | 4/2014 | Priebe et al. |
| 8,720,807 B2 | 5/2014 | Priebe et al. |
| 9,010,669 B2 | 4/2015 | Priebe et al. |
| D753,434 S | 4/2016 | Bazzicalupo et al. |
| 9,346,058 B2 | 5/2016 | Yamamoto et al. |
| 9,400,873 B2 | 6/2016 | Kamen et al. |
| 9,465,919 B2 | 10/2016 | Kamen et al. |
| D770,846 S | 11/2016 | Bueno |
| D772,643 S | 11/2016 | Bazzicalupo et al. |
| D796,254 S | 9/2017 | Thomas et al. |
| D797,495 S | 9/2017 | McConnell et al. |
| 9,750,975 B2 | 9/2017 | Hunter, Jr. et al. |
| D809,153 S | 1/2018 | Noble |
| D818,761 S | 5/2018 | Wang |
| D827,148 S | 8/2018 | Lam |
| D830,114 S | 10/2018 | Fung |
| D868,531 S | 12/2019 | Wong |

\* cited by examiner

PESTLE AND BOWL ASSEMBLY

FIELD OF THE INVENTION

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a pestle used with a mortar bowl or a sieve-mill bowl, and more particularly, to a pestle having an upper end connectable to an electric kitchen stand mixer, and a lower end containing one or more frictional components that permit crushing, grinding and/or straining of various items, such as food items.

BACKGROUND

Mortar bowls with pestles have existed for thousands of years. A mortar and a pestle are implements used since ancient times to prepare ingredients or substances by crushing and/or grinding them into a paste or powder in the kitchen, laboratory, and/or pharmacy. The mortar is a bowl, typically made of hard wood, metal, ceramic, or hard stone, such as granite. The pestle is a heavy and blunt club-shaped object, also made from one or more of the previously described elements. Many substances may be ground, including many food item(s) which may be wet or dry. The food item is placed in the mortar, where the food item is positioned between the mortar and pestle, such that the frictional motion of the pestle to press, rub, and/or rotated the food item against the mortar is used until the desired texture of the food item is achieved.

Electric kitchen stand mixers have been known and used in the home since the 1920s. However, mixers are designed to mix. Mixers do not crush, grind, or separate desired food parts from unwanted food parts, such as, for example, but not by way of limitation, skin and/or seeds of some fruits and vegetables.

What is needed is a pestle and bowl assembly that permits not only mixing but crushing, grinding, and separation of one part of a food item (skin, seeds, and the like) from another. It would also be desirably to have a pestle and bowl assembly that could be used "by hand" by a user as well as adapted to connect to an electric kitchen stand mixer so that a pestle could use a planetary spin movement as well as a rotational movement to crush, grind, and/or separate one part of a food item from another.

SUMMARY

In one embodiment of the invention, a pestle comprises an upper end adapted to operably connect to a kitchen stand mixer having an electric motor. The pestle also includes a center stem connected at one end to the upper end of the pestle. The pestle further comprises a lower end of the pestle connected to an opposite end of the center stem. The lower end includes a convex shape that includes a frictional surface. When the motor of the kitchen stand mixer is activated, the pestle spins in a symmetrical planetary orbit pattern and rotates simultaneously to crush, grind, and/or press one or more food items held within a bowl.

In one aspect of the one embodiment, the center stem is flexible. In another aspect of the one embodiment, the pestle is made from at least one of metal, plastic, glass, ceramic, stone, and wood. The upper end, center stem, and lower end of the pestle are in an axial alignment. In still another aspect of the one embodiment, the frictional end of the pestle includes a plurality of ridges. The plurality of ridges is formed in a swirl pattern. In a further aspect of the one embodiment, when the upper end of the pestle is connected to the kitchen stand mixer and the pestle is not locked in place, and when the electric motor is actuated, the pestle is permitted to move from a symmetrical planetary orbit pattern into an asymmetrical planetary orbit pattern to accommodates irregular thicknesses of food items held in the bowl.

In another embodiment of the present invention, a pestle and mortar bowl assembly comprises a pestle having an upper end adapted to operably connect to a kitchen stand mixer having an electric motor. The pestle includes a center stem, and the upper end of the pestle is connected to one end of the center stem. The pestle also comprises a lower end that is connected to an opposite end of the center stem. The lower end has a convex shape that includes a frictional surface thereon. The assembly also comprises a bowl. The bowl has a curved wall and the bowl is configured to receive the pestle as well as one or more food items therein. The bowl is operably held by the kitchen stand mixer. When the motor of the kitchen stand mixer is activated, the pestle spins in a symmetrical planetary orbit pattern and rotates simultaneously in the bowl and the pestle mixes, grinds, and/or presses the one or more food items held within the bowl.

In one aspect of the other embodiment, the bowl includes a curved wall. In another aspect of the other embodiment, the bowl includes one of: a bowl having an interior round lower end, a bowl having an interior lower flat end, a bowl having an interior lower end having a rounded protrusion extending upwardly therefrom, and a bowl having a plurality of openings formed therethrough. In still another aspect of the other embodiment, the center stem is flexible. In a further aspect of the other embodiment, the pestle is made from at least one of metal, plastic, glass, ceramic, stone, and wood. In still another aspect of the other embodiment, the frictional end of the pestle includes a plurality of ridges thereon. In still yet a further aspect of the other embodiment, the plurality of ridges is formed into a swirl pattern. In another aspect of the other embodiment, the upper end, the center stem, and the lower end of the pestle are in an axial alignment. And in a further aspect of the other embodiment, when the upper end of the pestle is connected to the kitchen stand mixer and the pestle is not locked into position, when the electric motor is actuated, the pestle is permitted to move from a symmetrical planetary orbit pattern into an asymmetrical planetary orbit pattern to accommodate irregular thicknesses of food items held in the bowl.

In a further embodiment of the invention, a method of using a pestle and bowl assembly includes providing a pestle. The pestle comprises an upper end adapted to operably connect to a kitchen stand mixer having an electric motor. A flexible center stem is connected at one end to the upper end of the pestle. The pestle includes a lower end which is connected to an opposite end of the flexible center stem. The lower end includes a convex shape that includes a frictional surface. The upper end of the pestle is connected to the kitchen stand mixer. The method further comprises providing a bowl. The bowl has a curved wall and the bowl is configured to receive one or more food items therein and the pestle therein. The bowl is positioned below the pestle. The electric motor of the kitchen stand mixer is then activated such that the pestle spins in a symmetrical planetary orbit pattern and rotates simultaneously in the bowl, the pestle crushing, grinding, and/or pressing one or more food items held within the bowl.

In one aspect of the further embodiment, in the step of connecting the upper end of the pestle to the kitchen stand mixer, the step further comprises not locking the pestle, so that in the step of actuating the electric motor, the pestle is permitted to move from a symmetrical planetary orbit pattern into an asymmetrical planetary orbit pattern to accommodate irregular thicknesses of food items held in the bowl.

In another aspect of the further embodiment, in the step of providing a bowl, the step further includes providing one of: a bowl having a lower flat end, a bowl having a rounded protrusion extending upward from a lower end of the bowl, and a bowl formed to have a plurality of openings formed therethrough.

In addition, yet another aspect of the further embodiment, in the step of providing a pestle, the pestle is made from at least one of from metal, plastic, glass, ceramic, stone, and wood.

Finally, in still yet another aspect of the further embodiment, in the step of providing a pestle, the frictional end of the pestle includes a plurality of ridges thereon.

BRIEF DESCRIPTION OF THE DRAWINGS

The disclosure will be better understood, and features set forth above will become apparent when consideration is given to the following detailed description thereof. Such description makes reference to the annexed drawings wherein.

DETAILED DESCRIPTION

Figure 1:
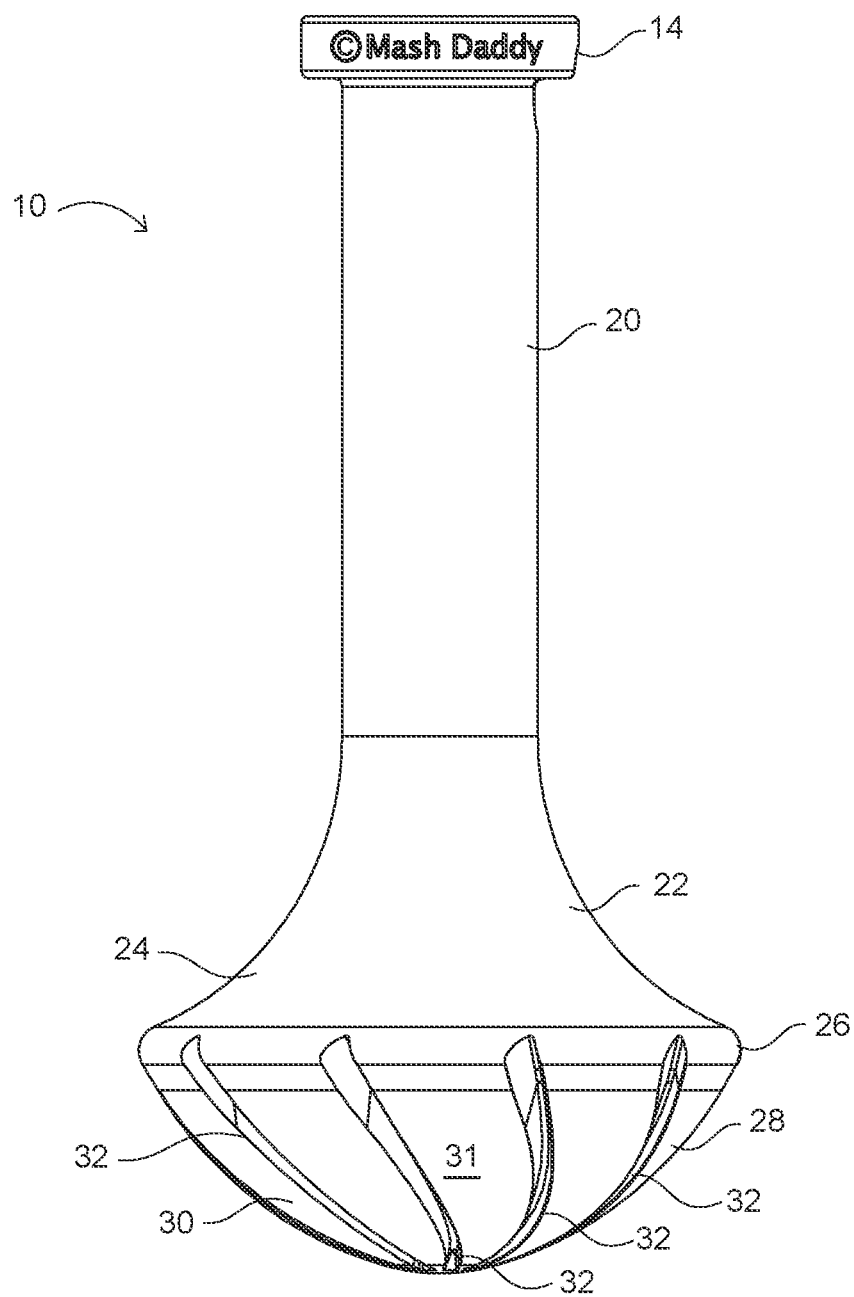
FIG. 1 is a right side view of the pestle of the present invention.
Figure 2:
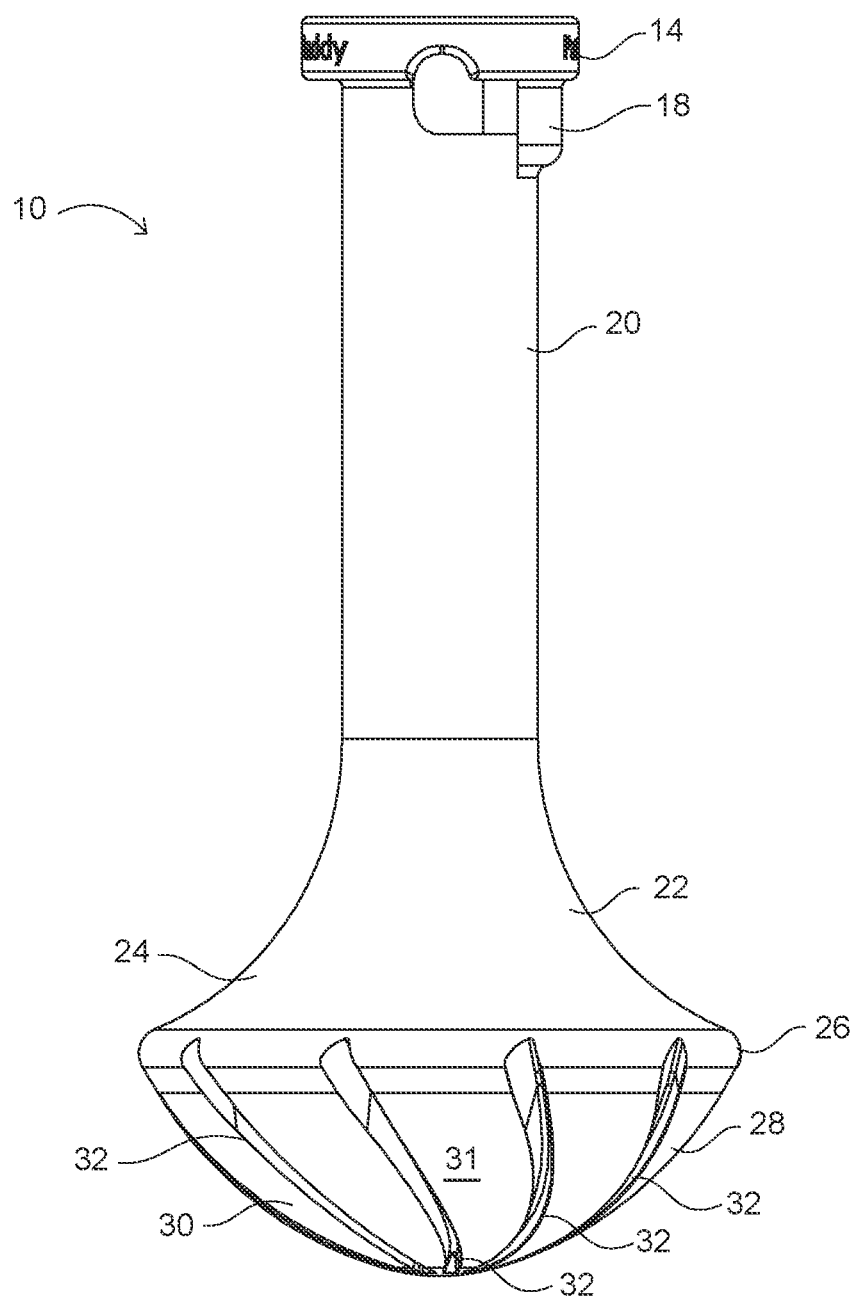
FIG. 2 is a left side view of the pestle of FIG. 1.
Figure 3:
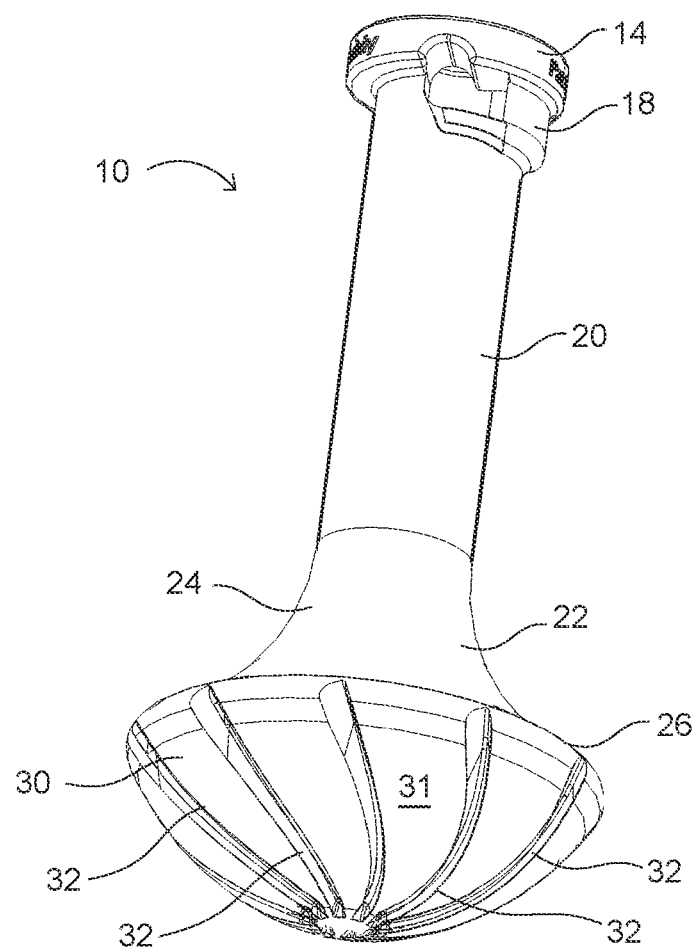
FIG. 3 is a perspective view of the pestle of FIG. 1.
Figure 4:
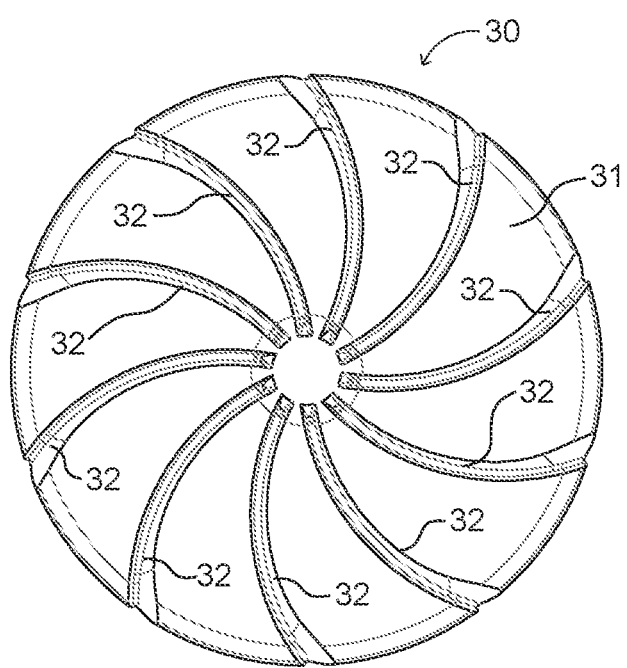
FIG. 4 is a top plan view of a lower grinding end of the pestle of FIG. 1.
Figure 5:
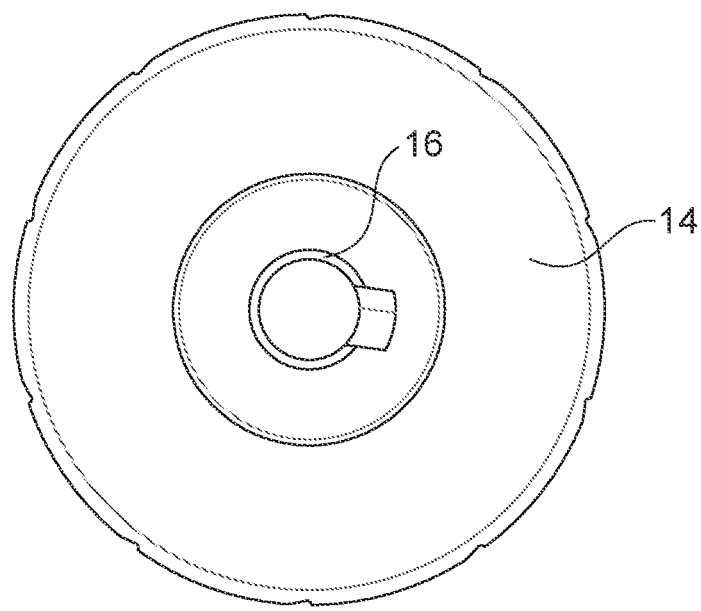
FIG. 5 is a top plan view of the upper end of the pestle of FIG. 1.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. The variations of "comprising", "including" and "having", such as, but not by way of limitation, "comprise", "include", "have" or "has", are also included in this definition. Any examples of operating parameters and/or environmental conditions are not exclusive of other parameters/conditions of the disclosed embodiments.

In a first embodiment of the present invention, a pestle for use with a bowl of an electric kitchen stand mixer is provided. In a second embodiment of the invention, a pestle and a mortar bowl assembly for use with an electric kitchen stand mixer is provided.

The pestle and the mortar bowl are attached and held, respectively, by an electric kitchen stand mixer. Each of the pestle and mortar bowl are connectable and detachable from a kitchen stand mixer. The pestle includes a flexible "stem" portion positioned between an upper end and a lower hemispherical end that includes a plurality or protrusions and/or ridges which form a grinding 'head' of the pestle. The convex hemispherical curvature of the pestle head coordinates with the generally concave curvature of a bowl, and particularly, with a mortar bowl. "Generally concave curvature of the mortar bowl," as used herein, means that a concave bowl may include, at a lower end thereof, an interior curved concave hemispheric-shaped rounded lower end, or alternatively, the lower end may be flat or planar with an adjacent curved hemispheric-shaped wall, or, in another alternative, the lower end the bowl may include an upward rounded convex protrusion and an adjacent curved hemispheric-shaped wall. The mortar bowl is desirably securely held by a base of the kitchen stand mixer. The pestle is then lowered into the mortar bowl or, alternatively, raised up, depending on configuration of the kitchen stand mixer.

Items, such as, but not by way of limitation, food items, which require grinding, crushing, and the like, are placed in one of a bowl or the mortar bowl, and the bowl is positioned on and/or connected to the base of the kitchen stand mixer. The pestle is connected to the kitchen stand mixer and positioned within the bowl or the mortar bowl. The kitchen stand mixer motor is then turned on and the pestle begins a planetary orbit motion of spinning and simultaneously rotating around the lower end and lower curved sides of the bowl or mortar bowl. The planetary orbit movement of the pestle causes food items in the bowl of mortar bowl to be compressed and/or ground against the lower end and/or interior curved walls of the bowl or mortar bowl. The result of the continuing motion of the pestle is that the food items in the one bowl or mortar bowl are slowly mixed and/or ground into smaller particles, via a user's speed control of the kitchen stand mixer. Food items which may be processed in this manor may include, but not by way of limitation, spices, cinnamon, cloves, sugar, salt, sage, pepper corns, and the like. Other food items may also be mixed and ground together, such as basil, oil, garlic, and pine nuts to make pesto or, alternatively, garlic, oil, and salt to make aioli. Liquids and solids may be mixed and stirred to create drink mixtures such as mint leaves, sugar, limes and rum to create mojito drinks. Other mixed drinks, by way of non-limiting example, may include other mixtures, such as mint julep, hot buttered rum, sangria wine and fruit mixture, fruit drinks, berry drinks, and the like.

Turning now to FIGS. 1-5, a pestle 10 configured for use with at least one commercially available electric kitchen stand mixer 12 (FIG. 6—illustrated via phantom lines) is shown. As illustrated in FIGS. 1-5, the pestle 10 includes an upper end 14 with an opening 15 therethrough, both the upper end 14 and the opening 16 adapted to connect to the kitchen stand mixer 12. The upper end 14 and the opening 16 therein includes one or more locking assemblies 18. The internal connection of the kitchen stand mixer 12 and the upper end 14 via the opening therein is known in the art. The upper end 14 is a part of a flexible cylindrical stem 20 which extends between the upper end 14 and a lower portion 22 of the pestle 10. The lower portion 22 includes an inwardly curved frusto-conical upper portion 24 which expands outward and provides a maximum outer circumference 26. It is connected to a convex hemispheric portion 28 which forms a "grinding end" or lower end 30 of the lower portion 22. The lower end 30 includes on a surface 31 thereof, a plurality of protrusions or raised ridges 32 extending over and a distance away from the hemispheric end 28 in a curved "swirl" pattern. The swirl pattern of the plurality of ridges 32 on the lower end 30 of the pestle 10 is designed to move food items down from the curved wall or sides of a bowl and to push the food items to a lower end or bottom of the howl for crushing and grinding between the lower end 30 of the pestle and the lower end of the bowl. It will be appreciated that other patterns of protrusions and/or ridges, and the like, may be utilized, as well as any frictional surface. Any combination of protrusions, ridges, and/or frictional surface(s) may be used, so long as the pestle 10 functions as shown and described in detail herein. "Frictional surface," as used herein, means a first surface that rubs against another, second surface, when at least the first surface is in motion. It will be appreciated that "frictional surface" may, but not by way of limitation, include one or more protrusions and/or ridges.

Figure 10:
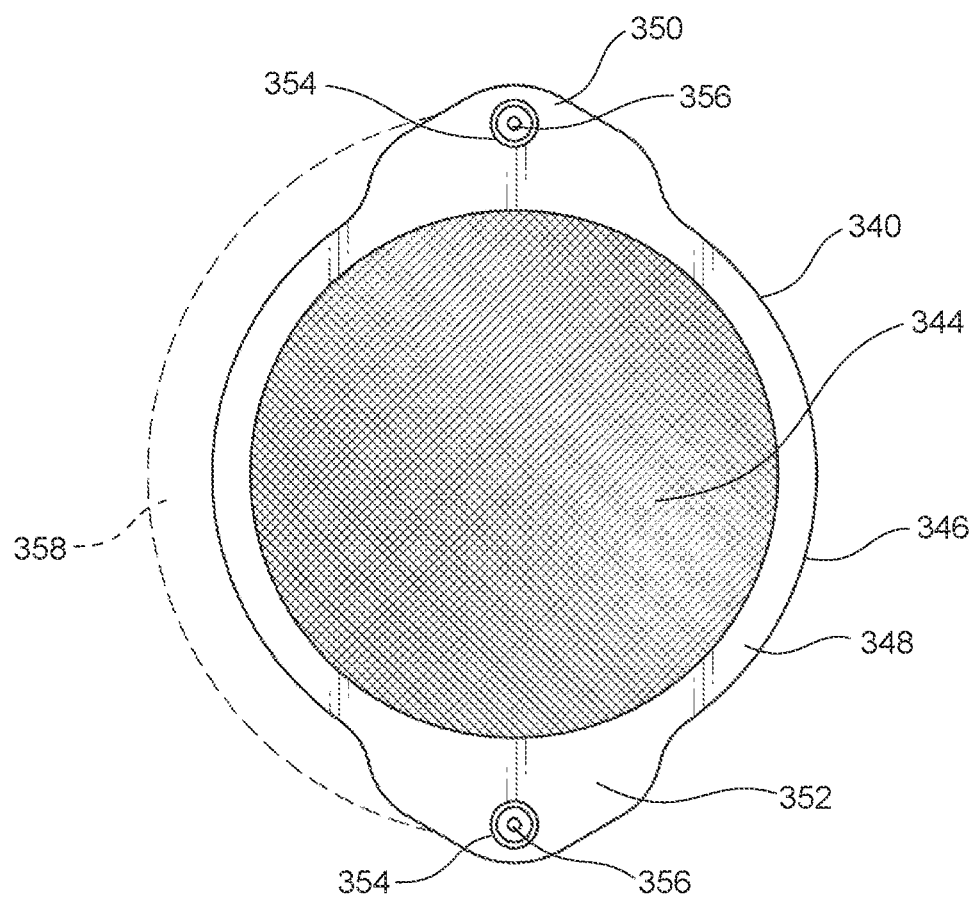
FIG. 10 is top plan view of an embodiment of a sieve-mill bowl and holder (shown in phantom lines) used in an alternative pestle and sieve-mill bowl assembly, as illustrated in FIG. 12.
Figure 11:
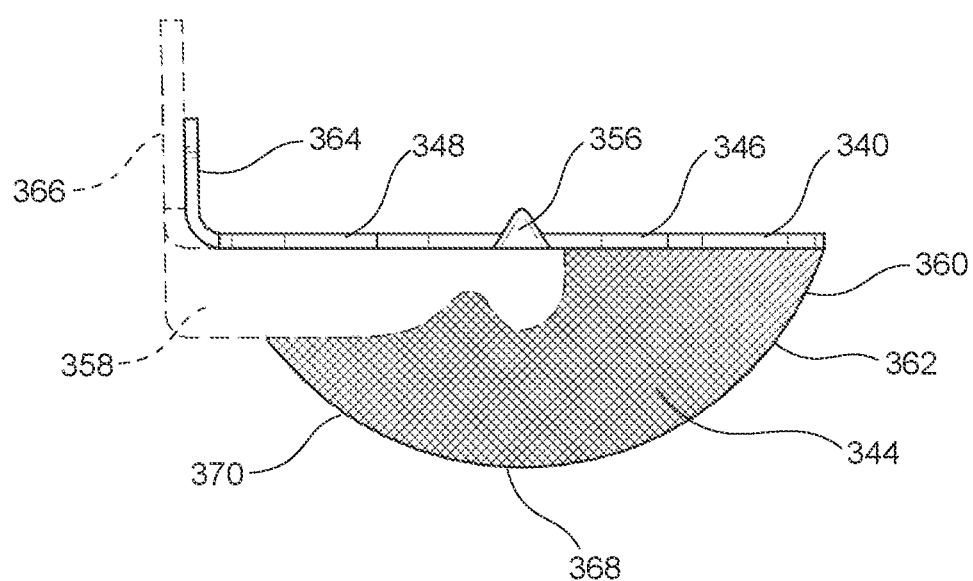
FIG. 11 is a side view of the sieve-mill bowl of FIG. 10, with a holder (shown in phantom lines)
Figure 12:
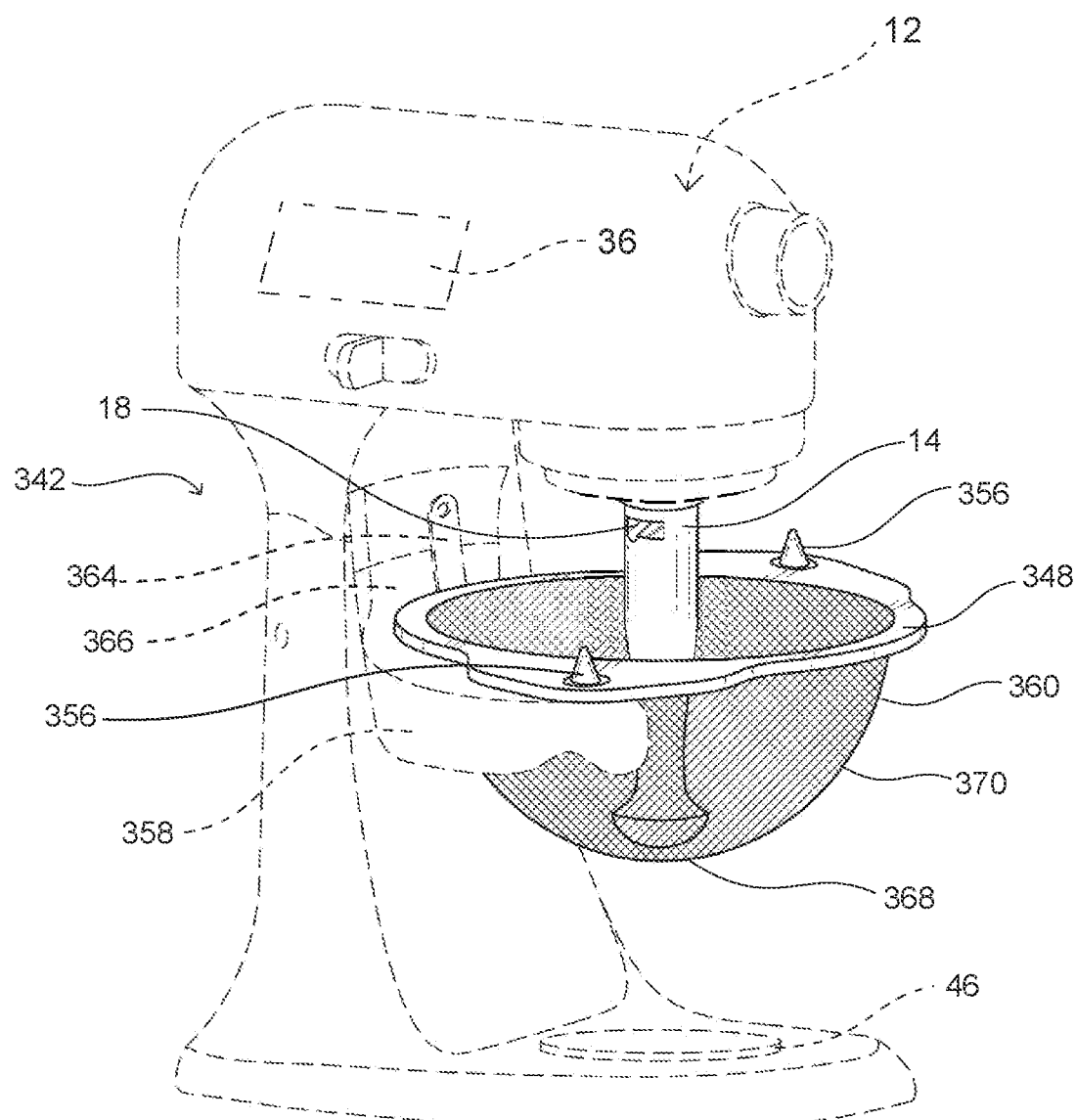
FIG. 12 is a perspective view of the pestle of FIGS. 1-5, but showing the sieve-mill bowl of FIGS. 10 and 11, the sieve-mill bowl held by a holder (shown in phantom lines), the pestle and sieve-mill bowl assembly connected to and held by an electric kitchen stand mixer (shown in phantom lines).

It will be appreciated that the pestle 10 may be used with a standard bowl having an internal hemispherical shape (a hemispherical interior end is illustrated in FIGS. 10-12). In addition, the pestle 10 may be used by hand to mix, crush, and/or grind various food item(s) in the bowl. However, such action may take time, effort, and some amount of skill on the part of a user, to obtain the desired consistency for various crushed and/or ground food items. It will be appreciated that the pestle 10 may desirably be connected to the standard electric kitchen stand mixer 12, so that a variety of different food items could be quickly and easily mixed, crushed, and/or ground into a desired consistency for each individual food item or group of food items.

Figure 6:
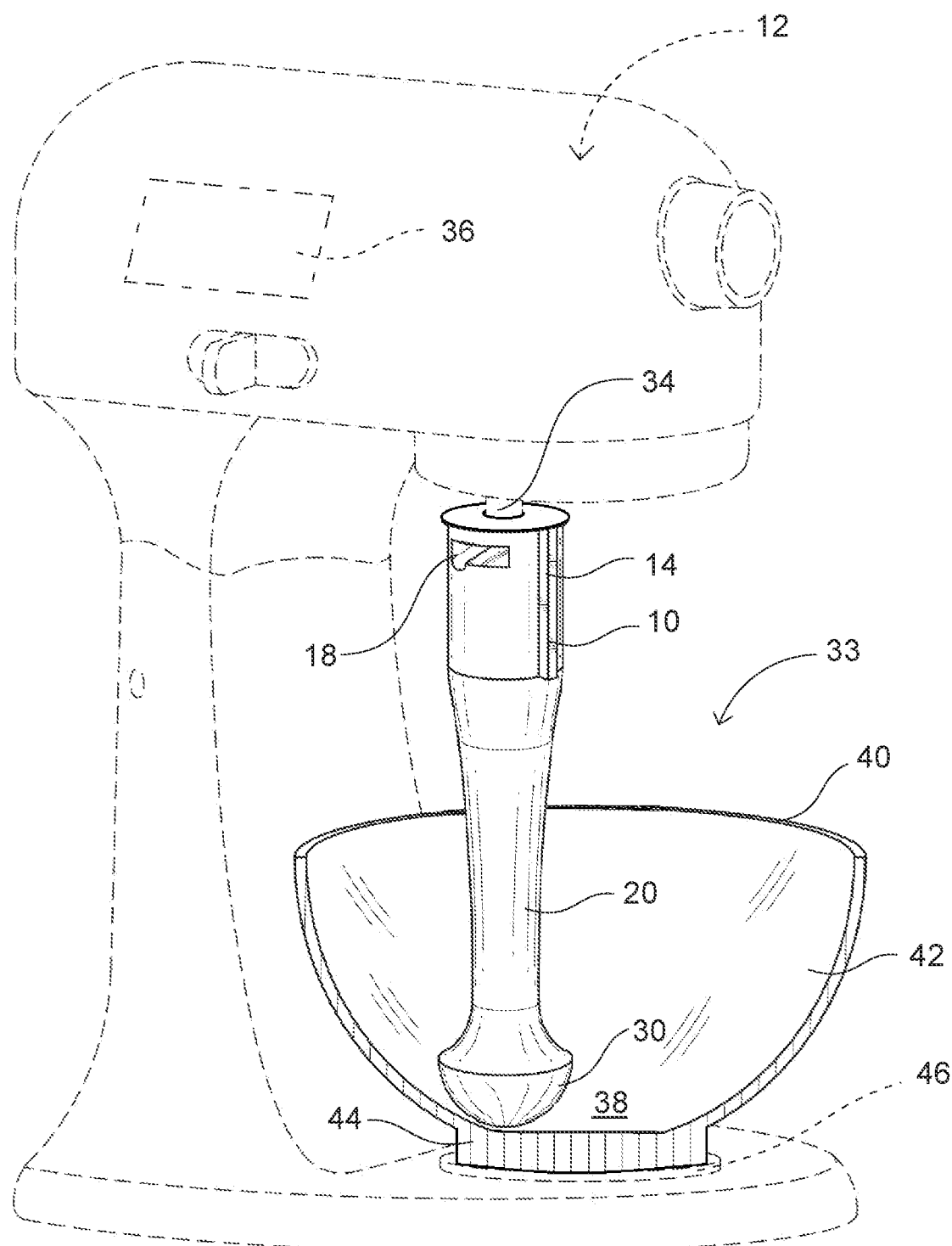
FIG. 6 is perspective view of the pestle of FIG. 1, but showing a pestle and bowl assembly connected to and held by, respectively, an electric kitchen stand mixer (shown in phantom lines), the bowl having a an interior lower flat end and curved walls, which are shown in cross-section.
Figure 7:
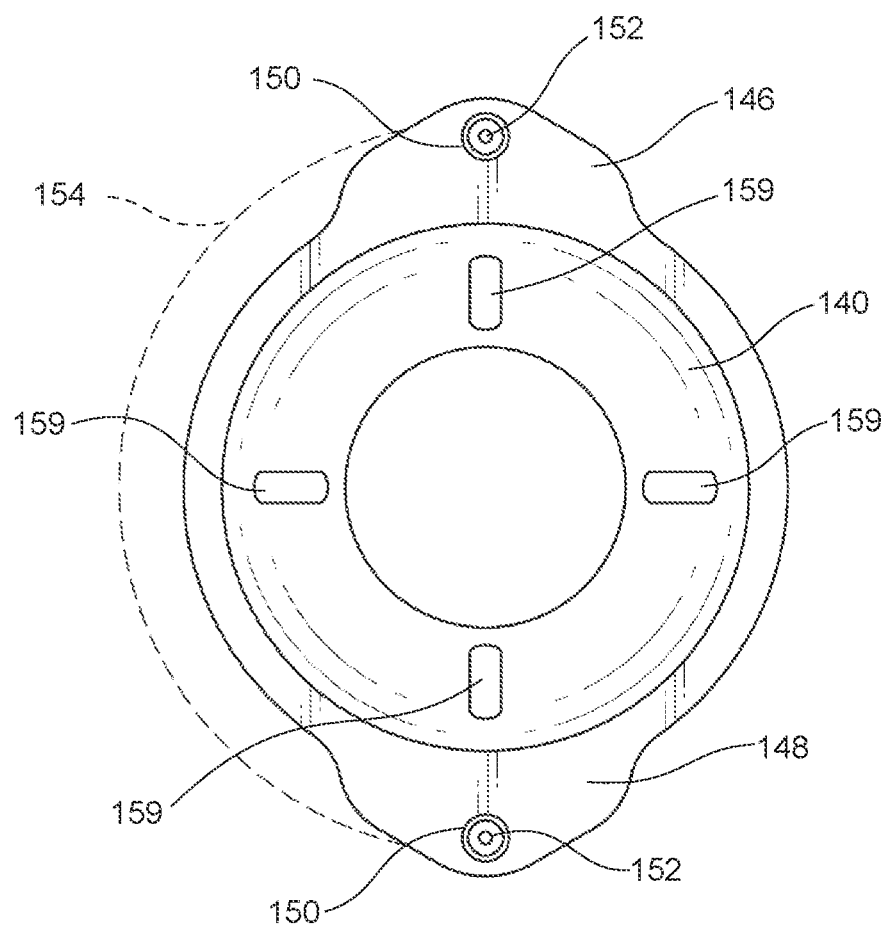
FIG. 7 is a top plan view of a bowl similar to the bowl shown in FIG. 6, but showing a holder (shown in phantom lines) for the bowl for use in a pestle and bowl assembly.
Figure 8:
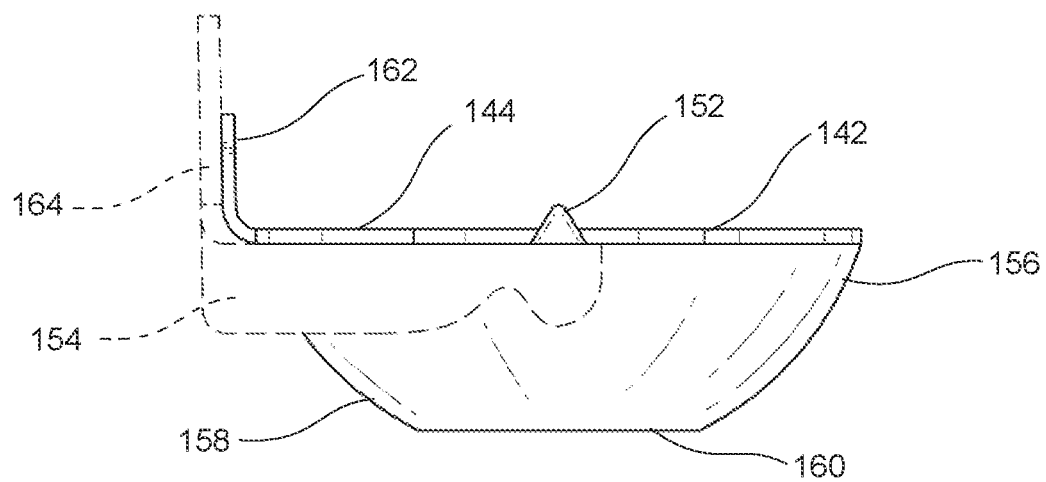
FIG. 8 is a side view of the bowl of FIG. 7, showing the holder (shown in phantom lines)

FIG. 6 illustrates one embodiment of a pestle and mortar bowl assembly 33. In this instance, the pestle 10 is operably connected to the kitchen stand mixer 12 via a shaft 34 extending from the kitchen stand mixer 12 having an electric motor 36 therein. The pestle 10 may desirably be positioned adjacent an internal lower flat end 38 of a mortar bowl 40, in order to crush, grind, and mix food items (not shown) positioned within the mortar bowl 40. The mortar bowl 40 desirably may be a round bowl having a circumferential curved wall 42 positioned about the internal flat end 38 of the mortar bowl 40. FIG. 6 slows the mortar bowl 40 on a pedestal 44 and/or formed with a pedestal 44, which is held on a base 46 of the kitchen stand mixer 12. However, FIGS. 7 and 8 illustrate the mortar bowl 40 without a pedestal positioned with the kitchen stand mixer 12 in an alternative manner which will be discussed in further detail below. Returning to FIG. 6, the pestle 10 may be positioned near (desirably, about within 1/16 of an inch) of the flat internal lower end 38 of the mortar bowl 40 to crush, grind, and mix food items (not shown) held within the mortar bowl 40. However, it will be understood that the distance between the lower end 30 of the pestle 10 and the flat end 38 of the mortar bowl 40 is also dependent upon the size and thickness of the food item(s) placed therein, as well as the desired amount of mixing and grinding a user desires for that/those particular food item(s). A user engages the motor 36 of the kitchen stand mixer 12, and the at least the lower end 30 of the pestle 10 moves in a planetary spinning motion as well as a rotating motion about the flat end 38 of the mortar bowl 10. The plurality of protrusions or ridges 32 on the lower end 30 operate to mix, and/or crush, and/or grinding the food item(s) until it/they are of a desired consistency determined by the user. The lower end 30 of the pestle 10 accomplishes this not only by use of the flat end 38 of the mortar bowl 40, but also by use of the curved wall 42 of the mortar bowl 40.

In an alternative embodiment of the mortar bowl 40, as shown in FIGS. 7 and 8, a mortar bowl 140 is provided which is substantially similar to mortar bowl 40, however, mortar bowl 140 does not include a pedestal 44. Mortar bowl 140 has a lip 142 extending about an upper end 144 thereof, and the lip 142 includes opposing spaced-apart extensions 146, 148 which may be formed with the lip 142. Each opposing extension 146, 148, includes an aperture 150 configured to accept a conical protrusion 152 provided by a C-shaped holder 154 which is positioned below approximately half of the circumference 156 of the lip 142. It will be understood that mortar bowl 140, as shown in FIGS. 6-8, includes a curved wall 158 extending downward from the upper end 144, and which may include raise ridges 159 on the interior of the bowl 140. The curved wall 158 connects to a flat end 160 of the mortar bowl 140. Mortar bowl 140 may also optionally include, formed from a portion of the lip 142, a curved flange 162 (FIG. 8) which may support the mortar bowl 140 against a similar flange 164 of the holder 154. The mortar bowl 140 and the pestle 10 together form an alternative pestle and mortar bowl assembly. It will be understood that the mortar bowl 140 and holder 154 may be positioned in the same manner as shown in FIG. 12. It will be appreciated that a method of use will follow that described above for pedestal and mortar bowl assembly 33.

Figure 9:
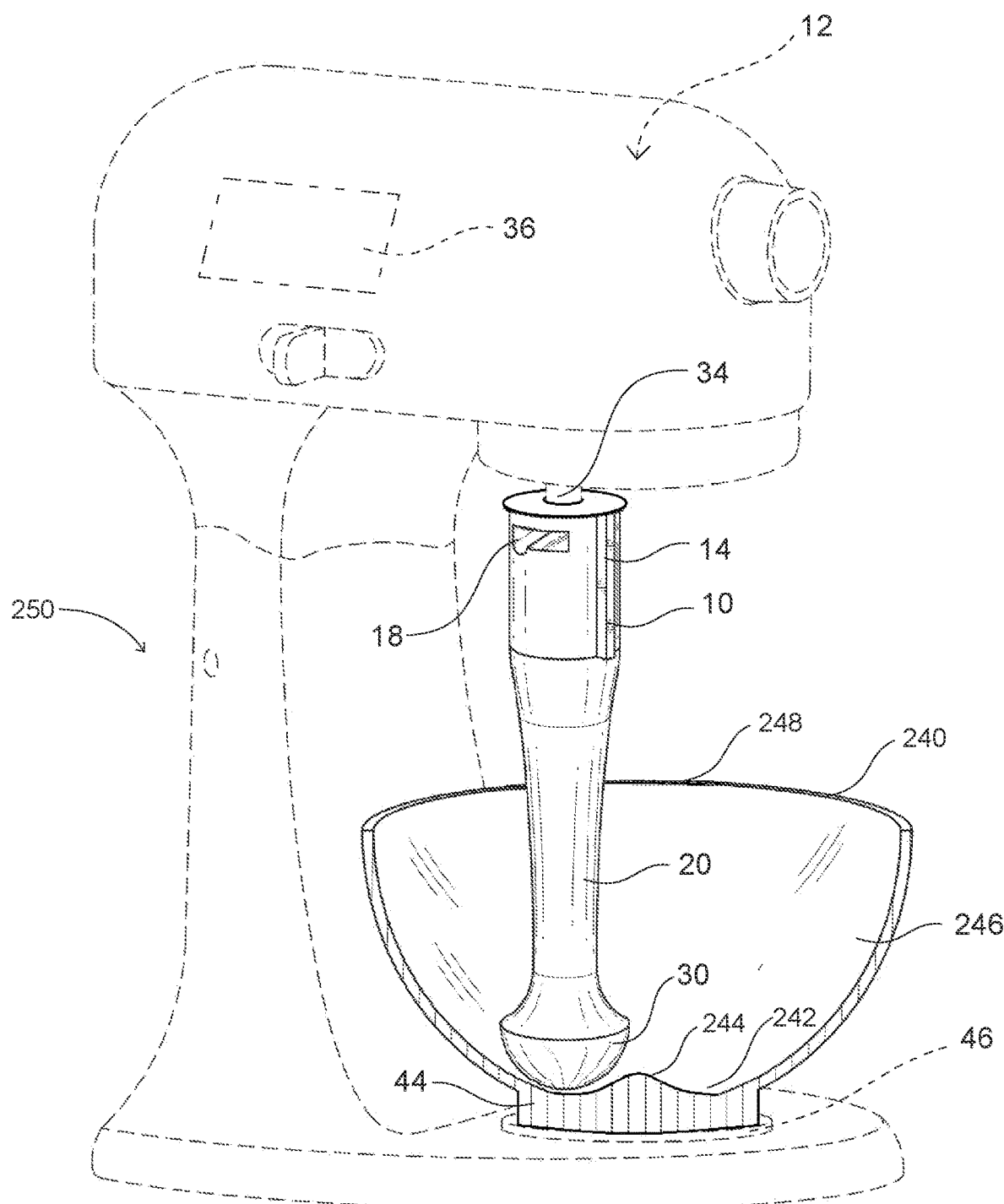
FIG. 9 is a perspective view of the pestle of FIG. 1, but showing an alternative pestle and bowl assembly, both alternative pestle and bowl connected to and held by, respectively, an electric kitchen stand mixer (shown in phantom lines), the bowl having a rounded upwardly extending protrusion in the interior lower end of the bowl, the bowl, protrusion, and curved wall shown in cross-section.

As illustrated in FIG. 9, another pestle and mortar bowl assembly is disclosed. The pestle 10 is the same as illustrated in FIGS. 1-5 and is used with an alternative mortar bowl 240. Mortar bowl 240 is similar to mortar bowl 40 shown and described in detail herein previously. However, mortar bowl 240 differs because it has an interior lower end 242 which has a rounded protrusion 244 extending upwardly from the lower end 242 of the mortar bowl 240. Similar to mortar bowl 40, mortar bowl 240 includes a circumferential curved wall 246 which connects to the lower end 242 of the mortar bowl 240. The curved wall 246 extends downwardly from an upper end 248 to connect to the lower end 242.

In this example, as shown in FIG. 9, the pestle 10 is operably connected to the kitchen stand mixer 12 via a shaft 34 extending from the kitchen stand mixer 12 having an electric motor 36 therein. The pestle 10 may desirably be positioned adjacent to the interior lower end 242 of the mortar bowl 240, in order to crush, grind, and mix food items (not shown) positioned within the mortar bowl 240. The mortar bowl 240 may be positioned on a pedestal 44 and/or may be formed with the pedestal 44, which is held on a base 46 of the kitchen stand mixer 12 (shown in phantom lines). However, it will be understood that the mortar bowl 240 may be held by the base 48 of the kitchen stand mixer 12 without the pedestal 44. The pestle 10 may be positioned near (desirably, about within $1/16$ of an inch) a portion of the lower end 242 and/or the protrusion 244 of the bowl 240, in order to crush, grind and/or mix food items (not shown) held within the mortar bowl 240. However, the distance between the lower end 30 of the pestle 10 and the lower end 242 with the rounded curved protrusion 244 is also dependent upon the size and thickness of the food item(s) placed therein, as well as the desired amount of mixing, crushing, and/or grinding a user desires for that/those particular food item(s). A user engages the motor 36 of the kitchen stand mixer 12, and at least the lower end 30 of the pestle 10 moves in a planetary spinning motion as well as a rotating motion about the protrusion 244 in the lower end 242 of the mortar bowl 240. The plurality of protrusions or ridges 32 on the lower end 30 of the pestle 10 operate to mix, and/or crush, and/or grinding the food item(s) against the lower end 242 of the bowl 240 and/or the protrusion 214 thereon until it/they are of a desired consistency determined by the user. Pestle 10 and mortar bowl 240 provide an alternative pestle and mortar bowl assembly 250.

In another embodiment of the present invention, a food mill and a sieve are combined into one bowl, for use with the previously shown and described pestle, as illustrated in FIGS. 10-12. The sieve-mill bowl takes its origin from a food mill and a sieve.

A common food mill consists of three parts: a bowl having a bottom plate with a plurality of holes, like a colander, and a crank. The crank is fitted with a bent metal blade that crushes food item(s) in the bowl and pushes and forces the food item(s) through the holes. The food mill may be positioned directly over a cooking pot, and is frequently used, by way of non-limiting example, to remove seeds from cooked tomatoes, or to make mashed potatoes from cooked potatoes.

A sieve is a utensil consisting of woven wire, metal mesh, or plastic mesh held in a frame, which is used for straining solids from liquids, for separating coarser pieces from finer particles, or for reducing soft solids to pulp. A sieve also is positioned over another container, such as, for example, a bowl, pot, pan, dish, and the like. A sieve may be hemispherical in shape, with a metal or plastic edge formed along an upper edge of an open end thereof. Therefore, the best features of a food mill and a sieve are combined into a sieve-mill bowl in an assembly with the pestle described above.

Turning now to FIGS. 10-12, a sieve-mill bowl 340 is used in combination with the pestle 10, to provide a pestle and sieve-mill bowl assembly 342. The sieve-mill bowl 340 is formed to have an internally concave shape and externally a hemispherical shape, desirably from woven wire, metal mesh, and/or plastic mesh, to have a plurality of small openings 344 therein, to hold one or more food item(s), so that a portion of the food item(s) will flow through the plurality of small openings 344 when the pestle is applied to the food items. The sieve-mill bowl 340 includes at an open upper end 346 a lip 348 which extends outwardly and horizontally, about the open upper end 346. The lip 348 includes an opposing spaced-apart pair of extensions 350, 352 which are formed with the lip 348. Each opposing extension 350, 352 includes an aperture 354 configured to accept a cone-shaped protrusion 356 therethrough. Each cone-shaped protrusion 356 may be provided by a C-shaped holder 358 which is substantially identical to C-shaped holder 154 previously shown and described in detail herein (shown in phantom lines) which is positioned about and below the lip 348. The holder 358 extends about approximately half of a circumference 360 of an exterior 362 of the sieve-mill bowl 340. The sieve-mill bowl 340 may also optionally include a curved flange 364 formed from a portion of the lip 348 (FIG. 11) which may assist in the support of the sieve-mill bowl 340 against a similar flange 366 (which is substantially similar to flange 164 of the holder 154—the flange 164 and the flange 366 shown in phantom lines). Such assistance may be in the form of a fastener (not shown), such as, but not by way of limitation, a bolt, a screw, a suction cup, or any apparatus known in the art and commercially available.

As illustrated in FIG. 12, the pestle 10 is operably connected to the kitchen stand mixer 12 via the shaft 34 extending from the kitchen stand mixer 12. The shaft 34 is rotated via an electric motor 36 positioned within the kitchen stand mixer 12, when the motor 36 is actuated by the user. The pestle 10 may desirably be positioned first, or, alternatively, it may be positioned after the holder 358 and the sieve-mill bowl 340 are positioning on the kitchen stand mixer 12. As previously noted, the pestle 10 is desirably positioned about $1/16^{th}$ of an inch away from a lower end 368 and/or a curved wall 370 of the sieve-mill bowl 340. However, it will be understood that the distance between the lower end 30 of the pestle 10 and the lower end 368 of the sieve-mill bowl 340 is also dependent upon the size and thickness of the food item(s) placed in the sieve-mill bowl 340. When the user engages the motor 36 of the kitchen stand mixer 12, and at least the lower end 30 of the pestle 10 moves in a planetary spinning motion as well as a rotating motion about the lower end 368 and curved wall 370 of the sieve-mill bowl 340. At least a desired portion of the food item(s) is/are desirably pressed by the motions of the pestle 10 and the plurality of protrusions/ridges 32 on the lower end against the mesh of the sieve-mill bowl 340 through the plurality of openings 344 in the sieve-mill bowl 340. Such portion(s) of the food item(s) that flow through the plurality of openings 344 are desirably, but not by way of limitation, in a uniform and smaller size. In another alternative, however, the plurality of openings may be provided in differing sizes and shapes. It will be understood that a container (bowl, pot, plate, and the like) will be positioned below the sieve-mill bowl 340 to receive the food items pushed through the sieve-mill bowl 340 by the pestle 10 (not shown).

In use, the pestle 10 may be connected to the kitchen stand mixer 12 and the upper end 14 of the pestle 10 may be locked to the shaft 34, so that when the electric motor 36 of the kitchen stand mixer 12 is activated, the pestle 10 spins in a symmetrical planetary orbit pattern and rotates simultaneously to crush, grind, and/or press one or more food items held within a bowl 40, 140, 240, 340. The lock of the pestle 12 to the kitchen stand mixer 12 prevents the pestle from moving out of the symmetrical planetary orbit.

However, when some food items that are "lumpy" or irregularly shaped are positioned in a bowl 40, 140, 240, and 340, the upper end 14 of the pestle 12 may be connected to the kitchen stand mixer 12 but the locking assembly 18 on the upper end 14 of the pestle 10 may remain unlocked, to permitted the pestle 10 to move from a symmetrical planetary orbit pattern into an asymmetrical planetary orbit pattern to accommodate irregular thicknesses of food items (not shown) held in the bowl 40, 140, 240, 340. Such an asymmetrical planetary pattern may permit both upward and downward movement (via a spring on the shaft 34 (not shown)) as well as some side-to side movement of the pestle 10, thereby creating a "wobble" or asymmetry in the planetary orbit of the pestle 10.

Examples of such food items which may be placed in the sieve-mill bowl 340 for processing include, but not by way of limitation, flour, powdered sugar, cottage cheese, potatoes, and the like. Additional food items which may be processed in the sieve-mill bowl 340 include, but not by way of limitation, food items that require removal of an outer skin and/or seeds, such as strawberries, grapes, apples, oranges, lemons, and the like.

The pestle 10 and/or the bowls 40, 140, 240, and 340 may be made from at least one of (by way of non-limiting example) metal (steel or aluminum), plastic, glass, ceramic, stone, and wood. It will be appreciated that any known material(s) or combinations thereof may be used for the pestle 10 and bowls 40, 140, 240, and 340, so long as the pestle 10 and bowls 40, 140, 240, and 340 operate as shown and/or described herein.

It will be understood that the kitchen stand mixer 12 may be any commercially available mixer, but desirably, the kitchen stand mixer 12 may be a KitchenAid® brand mixer.

The foregoing is considered as illustrative only of the principles of the disclosure. Further, since numerous modifications and changes will readily occur to those of ordinary skill in the art, it is not desired to limit the disclosure to the exact construction and operation shown and described, and accordingly, all suitable modifications and equivalents may be resorted to, and fall within the scope of this disclosure.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method of using a pestle adapted for use with a kitchen stand mixer activated by an electric motor, the method comprising:
   providing a pestle including
      an upper end, at least a portion of the upper end formed to include a locked position and an unlocked position;
      a center stem connected at one end to a lower portion of the upper end; and
      a lower end of the pestle connected to an opposite end of the center stem, the lower end including a convex shape that includes a frictional surface thereon;
   connecting the upper end of the pestle to the kitchen stand mixer and positioning the upper end in an unlocked position; and
   actuating the electric motor thereby causing the pestle to rotate in an asymmetrical planetary orbital pattern.

2. The method of claim 1, wherein the center stem is flexible.

3. The method claim 1, wherein in the step of providing a pestle, the pestle is made from at least one of metal, plastic, glass, ceramic, stone, and wood, and wherein the upper end, center stem, and lower end of the pestle are in an axial alignment.

4. The method of claim 1, wherein in the step of providing a pestle, the upper end, the center stem, and the lower end of the pestle are in an axial alignment.

5. The method of claim 1, wherein in the step of providing a pestle, the frictional surface of the pestle includes a plurality of ridges.

6. The method of claim 5, wherein the plurality of ridges are formed in a swirl pattern.

7. A method of using a pestle and bowl assembly, the method including:
   providing a pestle, comprising an upper end adapted to operably connect to a kitchen stand mixer having an electric motor, a flexible center stem connected at one end to the upper end of the pestle and a lower end of the pestle is connected to an opposite end of the flexible center stem, the lower end including a convex shape that includes a frictional surface thereon;
   connecting the upper end of the pestle to the kitchen stand mixer and positioning the upper end in an unlocked position;
   providing a bowl, the bowl having a curved wall and configured to receive the pestle and one or more food items therein;
   positioning the bowl below the pestle; and
   actuating the electric motor thereby causing the pestle to rotate in an asymmetrical planetary orbital pattern, and the pestle simultaneously rotates in and against at least a portion of the bowl, the unlocked position of the pestle accommodating irregular thicknesses of food items held in the bowl, and the lower end of the pestle crushing, grinding, and/or pressing one or more food items held within the bowl against the bowl during rotation thereof.

8. The method of claim 7, wherein the bowl is one of a bowl having an interior lower rounded end, a bowl having a lower flat end, a bowl having a rounded protrusion extending upward from a lower end of the bowl, and a bowl formed to have a plurality of openings formed therethrough.

9. The method of claim 7, wherein in the step of providing a pestle, the pestle is made from at least one of metal, plastic, glass, ceramic, stone, and wood.

10. The method of claim 7, wherein the upper end, the center stem, and the lower end of the pestle are in an axial alignment.

11. The method of claim 7, wherein in the step of providing a pestle, the frictional surface of the pestle includes a plurality of ridges thereon.

12. The method of claim 11, wherein the plurality of ridges are formed in a swirl pattern.

\* \* \* \* \*